United States Patent
Coffey et al.

(10) Patent No.: US 7,020,129 B2
(45) Date of Patent: Mar. 28, 2006

(54) DYNAMIC ASSIGNMENT OF TELECOMMUNICATIONS SWITCHES AND PACKET SWITCH GATEWAYS

(75) Inventors: Charles William Coffey, Aurora, IL (US); John Andrew Johnson, Wheaton, IL (US); David B. Smith, Hinsdale, IL (US); Matthew Richard Smith, Hinsdale, IL (US); George Paul Wilkin, Bolingbrook, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 904 days.

(21) Appl. No.: 09/874,485

(22) Filed: Jun. 5, 2001

(65) Prior Publication Data

US 2002/0181443 A1 Dec. 5, 2002

(51) Int. Cl.
*H04L 12/66* (2006.01)

(52) U.S. Cl. .................. 370/352; 370/392

(58) Field of Classification Search .......... 370/338, 370/352, 356, 389, 392, 401, 265.09, 88.17; 709/230, 250
See application file for complete search history.

(56) References Cited

U.S. PATENT DOCUMENTS

| | | | | |
|---|---|---|---|---|
| 5,303,344 A | * | 4/1994 | Yokoyama et al. | 709/230 |
| 5,636,216 A | * | 6/1997 | Fox et al. | 370/402 |
| 5,848,053 A | | 12/1998 | Ardon | 370/218 |
| 6,130,892 A | * | 10/2000 | Short et al. | 370/401 |
| 6,771,674 B1 | * | 8/2004 | Schuster et al. | 370/537 |
| 6,836,481 B1 | * | 12/2004 | Hotta | 370/392 |
| 2002/0150230 A1 | * | 10/2002 | Fang | 379/265.09 |

* cited by examiner

*Primary Examiner*—Duc Ho
*Assistant Examiner*—Phuongchau Ba Nguyen

(57) ABSTRACT

Apparatus and a method for serving telecommunications customers, using the transmission capabilities of a Packet Network. A customer having Customer Premises Equipment (CPE) that includes a Customer Premises Equipment (CPE)/Gateway for communicating with a Packet Network, is connected to a port of the Packet Network. The customer is connected to the Gateway of a Home Switch via the Packet Network, and is also connected to Gateways of one or more Guest Switches. The customer has telephone numbers in the Home Switch and each of the Guest Switches. Callers can call the customer as if that customer were directly served by the Home Switch or any of the Guest Switches. Advantageously, the customer and callers to that customer are billed only for the short, usually local, call rate from the selected Home or Guest Switch. Advantageously, the customer can make outgoing calls dynamically via any of the Guest Switches.

4 Claims, 4 Drawing Sheets

DYNAMIC ASSIGNMENT OF TELECOMMUNICATIONS SWITCHES AND PACKET SWITCH GATEWAYS

TECHNICAL FIELD

Figure 1:
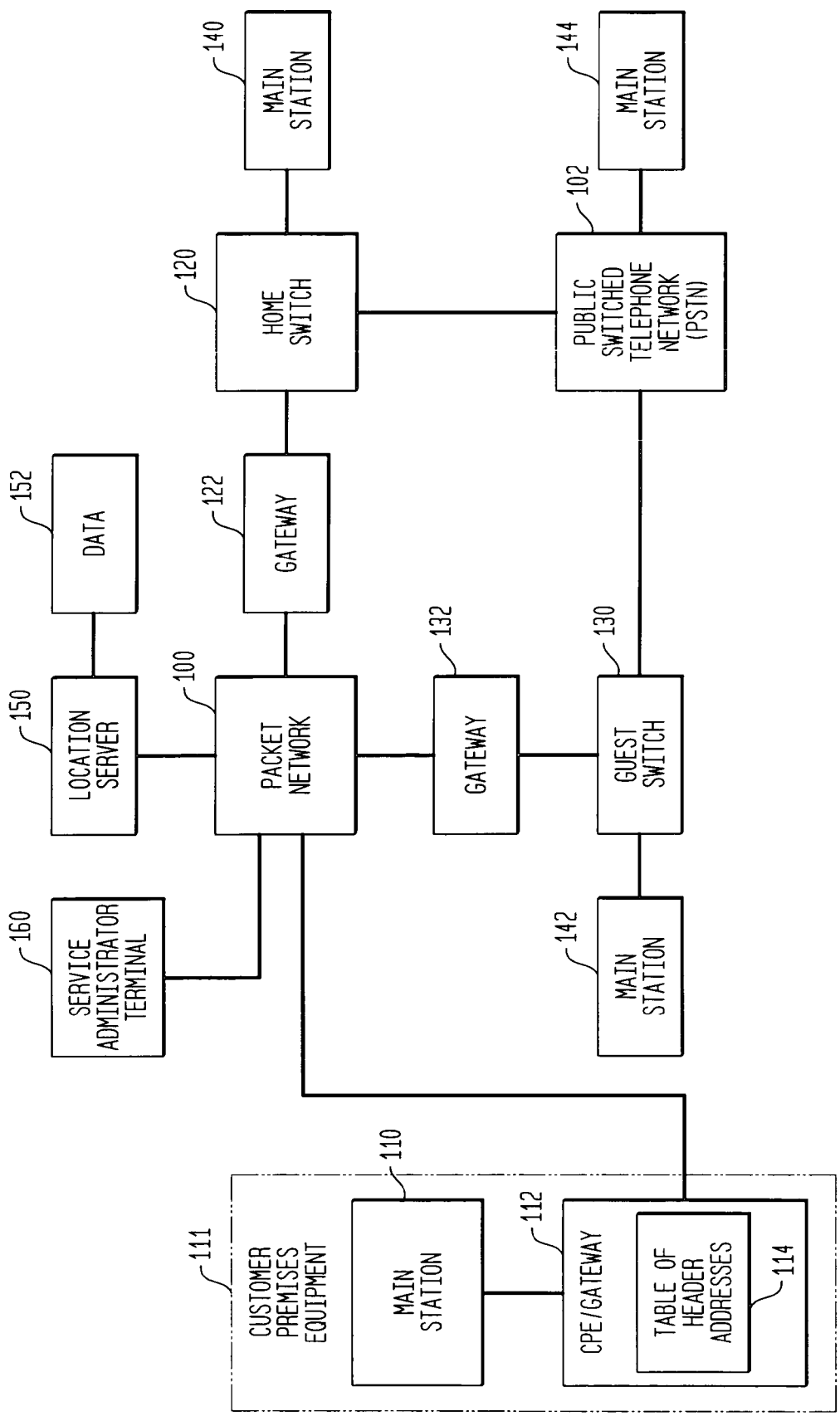

This invention relates to the association between individual telecommunications stations, and switches and packet Gateways for serving these stations.

PROBLEM

This invention is aimed to alleviate a number of problems that exist in the present telecommunications networks.
1. Foreign Exchange Service is expensive, inflexible, and tends to under-utilize telecommunications transmission facilities.
2. Foreign Exchange Service is a service wherein a particular telecommunications station located in one geographical point closest, and connected to, a first telecommunications switch, is served and billed as if that station were directly connected to a second telecommunications switch. This service provides no protection against failure of either switch.
3. Dual homing arrangements tend to be sufficiently expensive that in practice, they are not used; instead, a critical telephone station is simply connected to two switches. A dual homing arrangement is one wherein a telecommunications station is served by either of two switches, so that service is not interrupted if either of the switches fails. This type of arrangement is popular, for example, with brokerage houses, who cannot afford the very high cost of being unable to communicate with their customers. The arrangement is expensive, wasteful of resources, and requires the use of separate networks that cannot be managed as one. Further, it usually does not provide adequate service to all lines in case of a node failure.
4. Roaming land-line customers are difficult to serve economically. Arrangements for roaming wireless customers are well-known and widely used; however, comparable arrangements to permit a telephone customer to receive and originate calls with predetermined feature sets and billing arrangements from alternate locations are not readily available, and tend to be expensive.
5. Isolated capacity of telecommunications switches is inefficient. Telecommunication switches tend to be assigned permanently to a fixed group of telephone customers. If they are overloaded temporarily, it is not possible to call on available capacity in other end office switches to relieve that overload, and, consequently, service is degraded.

SOLUTION

The above problems are all alleviated in accordance with Applicants' invention, wherein a sub-set of telecommunications stations are connected to a Packet Network; the Packet Network provides a dynamic route for members of this sub-set to be served from any switch connected to that Packet Network; each switch has a service record identifying the feature and billing specifications of such customers.

This type of arrangement makes possible the following types of services:
1. A station of the sub-set can be served from any switch connected to the packet network interconnecting these switches. For example, in one preferred embodiment, the Packet Network serves both a New York and a London Switch, and a station connected to the Packet Network can have incoming and outgoing calls served from either of these switches. Effectively, this makes possible Foreign Exchange Service, since London callers can call a Main Station (MS) as if it were a London Station, and vice versa, and New York callers can call the station as if it were a New York station, and vice versa. At each end of a connection, a translation between a directory number (telephone number) and an end station address, such as Internet Protocol (IP) address, is provided.
2. In accordance with one preferred embodiment of Applicants' invention, a call between members of the sub-set of Main Stations (MSs) can be controlled by a switch serving either of these stations. That switch then receives signaling packets representing signaling information from the stations involved in the call. However, once a connection has been established between the two stations, voice packets between the two stations can go over the Packet Network without having to be switched by that telecommunications switch.
3. Calls between stations of the sub-set and other stations can be established by establishing a connection between the station of the sub-set via the Packet Network and a switch connected to the Packet Network; that switch may either be connected directly to the other telephone station or may use a connection through the Public Switched Telephone Network (PSTN) to access the other telephone station. Advantageously, resource utilization of the PSTN can be minimized in this way.
4. Calls between telephone stations which are not a member of the sub-set can be established using the Packet Network as a transmission facility between switches connectable to the two end stations, and each connected to the Packet Network. Advantageously, resource utilization of the PSTN is minimized.

In accordance with one preferred embodiment of Applicants' invention, a Visitor Database for incoming and outgoing calls is available for storing the identity of a switch serving a customer identified with a particular telephone number. This database is consulted to find the identity of the switch currently serving that customer when that customer is not served by that customer's home switch. Advantageously, such customers can be readily connected, and can receive incoming calls and make outgoing calls as soon as they have registered their present location in the telecommunications network, thus providing a form of roaming service In one preferred embodiment of Applicants' invention, at least a sub-set of the sub-set of Main Stations (MSs) is served by a cable system using voice over IP over the cable. The Distribution Network provides a packet interface between the Main Station (MS) and a router for accessing the Packet Network. Advantageously, this type of arrangement uses a popular embedded plant for providing the enhanced service available to the sub-set of Main Stations (MSs).

In accordance with one preferred embodiment of the invention, a sub-set of Main Stations is connected to the Packet Network via a Customer Premises Equipment Gateway (CPE/Gateway). These stations then communicate with a Switch that is equipped with, or connected to, a Switch Gateway to an IP Network. These customers are served by a Home Switch connected to such an IP Gateway, or can request to be served for outgoing calls from a different (Guest) Switch. For incoming calls, such customers can also be registered in one or more Guest Switches for which they have separate telephone numbers. The caller can then dial the number of the customer as assigned in the Home Switch, or as assigned in any of the Guest Switches, and will be connected via the Public Switched Telephone Network (PSTN), (or such alternatives as may use packet switching and routing for all or part of this connection), to the Home or Guest Switch. The Home or Guest Switch which is equipped with an IP Gateway, then uses that IP Gateway to communicate with the CPE/Gateway of the called customer to establish a connection, and to route voice packets of the connection to the called customer. Advantageously, callers can call this customer via any of the Guest Switches in which this customer is registered. The Guest Switch translates the called directory number to the called IP Gateway address, using Internet Tables, or consulting a Visitor Location Server.

If a customer having an enhanced Main Station equipped with a CPE/Gateway makes a call, that customer can establish the call via the Packet Network to any of the Switches in which the customer is registered, including both the Home Switch and the Guest Switches. In this way, the only part of the connection that requires the use of the Public Switched Telephone Network (PSTN), is the portion from the selected Home or Guest Switch to the destination telephone.

In accordance with one feature of Applicants' invention, the customer having an enhanced Main Station, can plug into any port of the Packet Network Register, and thereafter, receive normal service as provided in the preferred embodiment by that customer's Home Switch. A location server provides information about that customer's port location to Guest and Home Switches. Advantageously, the customer can move without losing services.

Advantageously, calls made by a calling party can be dynamically assigned a destination Gateway IP Address based on intelligence of the calling party CPE Gateway, and utilizing the concepts of least cost routing, network failure bypass, and use of assigned call processing features.

BRIEF DESCRIPTION OF THE DRAWING(S)

Figure 2:
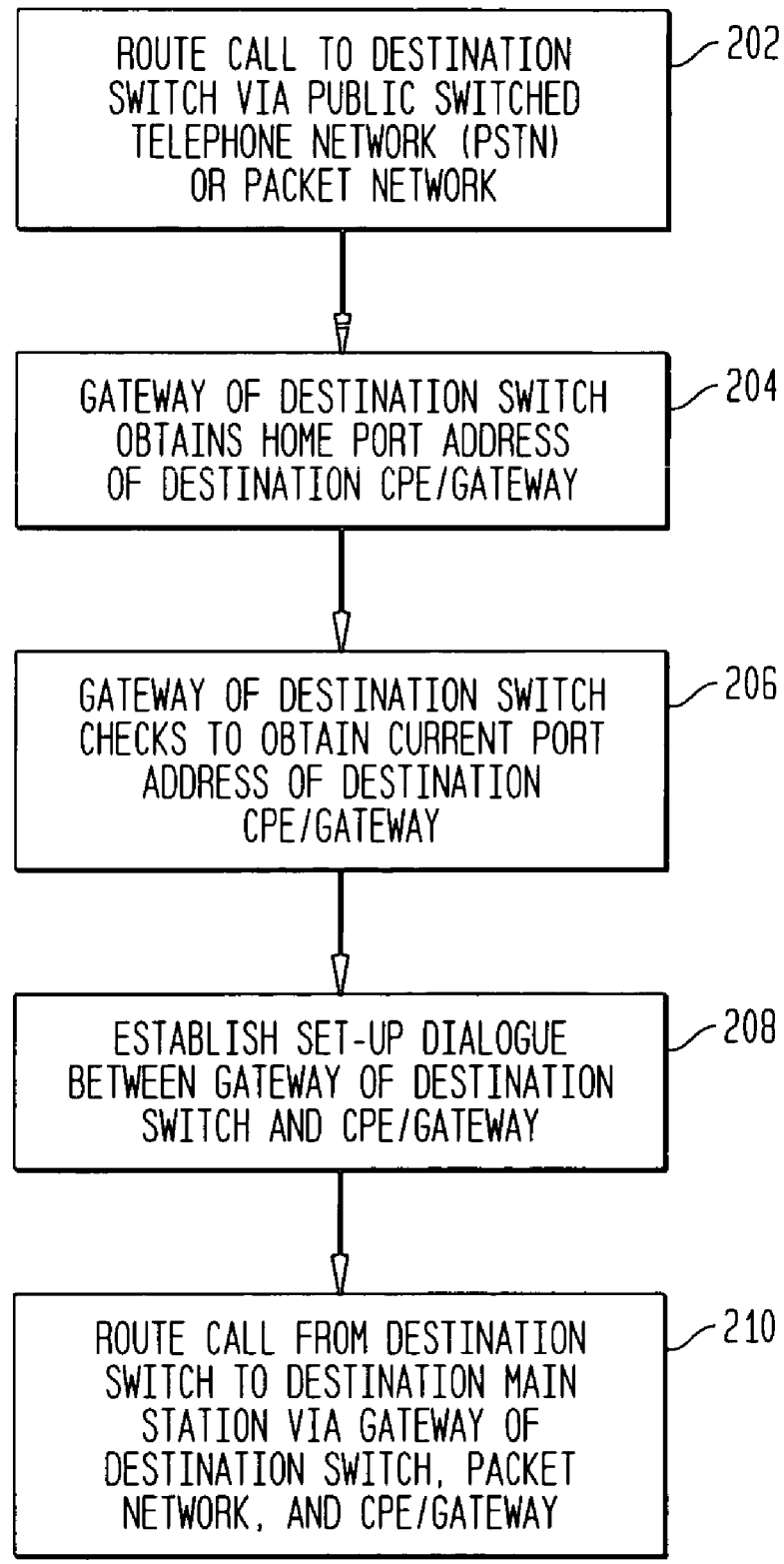
Figure 3:
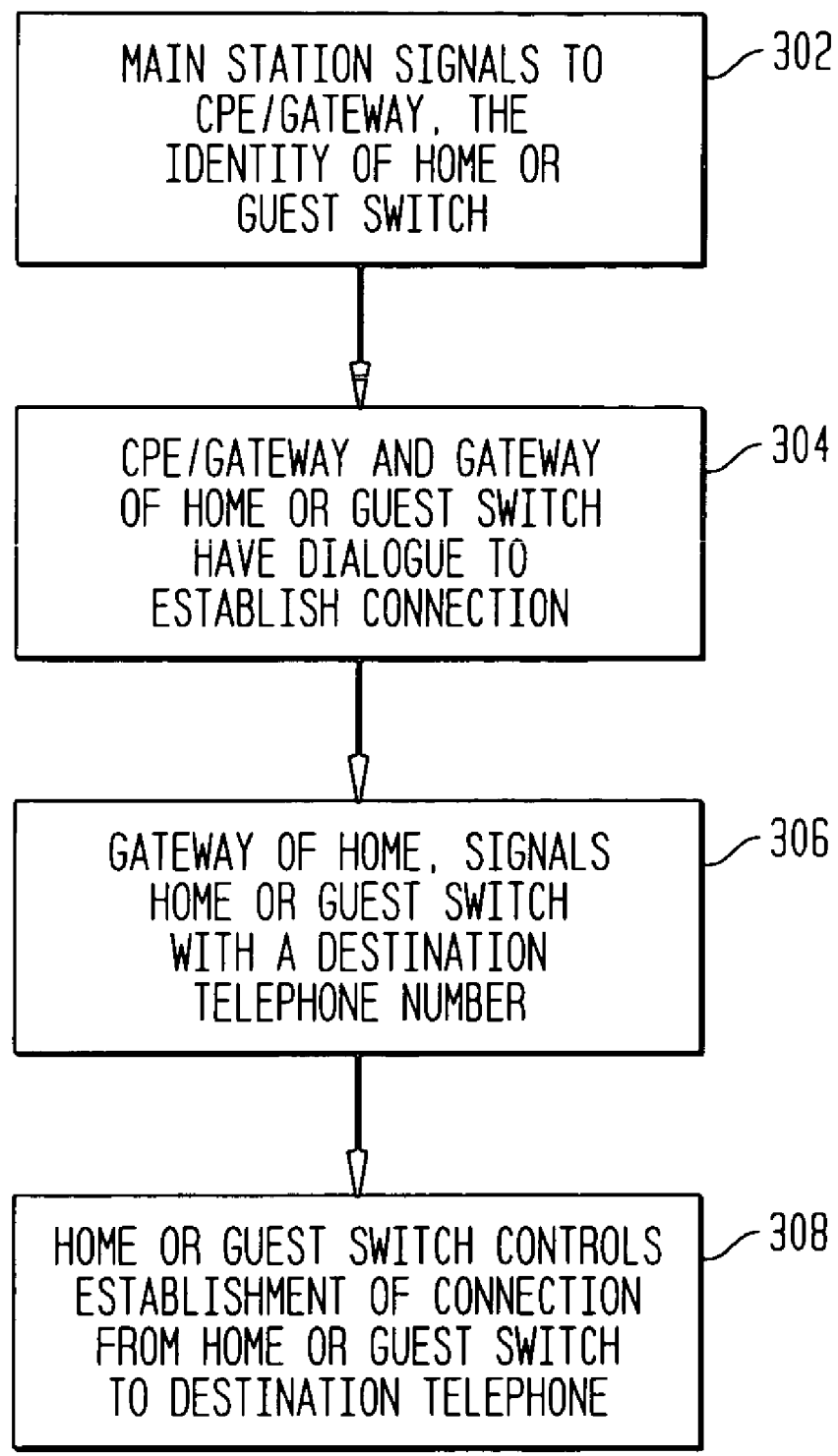
Figure 4:
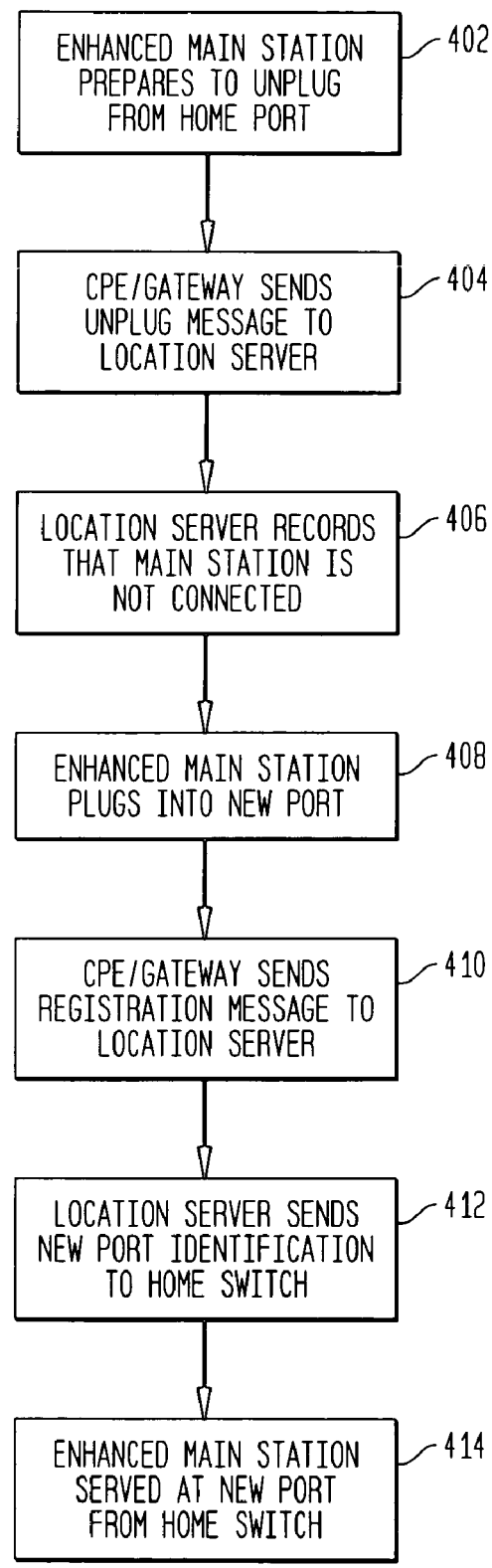

FIG. 1 is a block diagram illustrating the architecture of Applicants' invention; and FIGS. 2–4 are flow diagrams illustrating the operation of Applicants' invention.

DETAILED DESCRIPTION

FIG. 1 is a block diagram illustrating the operation of Applicants' invention. The key access network is Packet Network (100). This Packet Network can be the Internet if the Internet can provide adequate quality voice service, either through normal improvements of the Internet, or through special priority service for Internet voice packets. Alternatively, Packet Network (100) can be any other Packet Network having a wide area of reach. Customer Premises Equipment (CPE) (111) includes an enhanced telephone Main Station (110), and CPE/Gateway (112). Enhanced Telephone Main Station (110) is normally served by Home Switch (120). Main Station (110) is connected to Home Switch (120) through Packet Network (100). Such a connection requires two Gateways; a (CPE)/Gateway (112) attached to enhanced Main Station (110), and Gateway (122), which serves as an interface between Packet Network (100) and Home Switch (120). The functions of Gateway (122) are to convert between the voice signals used in Switch (120) and the packetized voice signals transported by Packet Network (100). Similarly, the CPE Gateway (112) converts between the voice signals generated by enhanced Main Station (110), and the packetized voice signals transported by Packet Network (100). If the destination of a call from Main Station (110) is a Main Station (140) served by Home Switch (120), then the voice signals generated in Home Switch (120) are analog signals for communicating with an analog Main Station. If the destination Main Station is a Main Station such as Main Station (144), not served by Home Switch (120), then, the voice signals are likely to be Pulse-Code Modulation (PCM) signals used for communicating over the Public Switched Telephone Network (PSTN) (102). What has been described so far, is available in the prior art. In accordance with Applicants' invention, enhanced Main Station (110) is arranged to signal that a call should be established, using, not Home Switch (120), but Guest Switch (130). The enhanced Main Station and its CPE/Gateway are enhanced to process a signal indicating a choice of Guest Switches to the CPE/Gateway, which then uses a packet header associated with a path to that Guest Switch. Effectively, the CPE/Gateway can modify the destination IP address to take into account least cost routing and/or switch failures. The signal to choose a Guest Switch can be a Dual-Tone Multi-Frequency (DTMF) Signal from the Main Station, or a special signal (extra key) for that purpose. The CPE/Gateway stores packet addresses for accessing the Home Switch or any of the Guest Switches. The CPE/Gateway can dynamically route a call over the packet network to one or more Public Switched Telephone Network (PSTN) Switches.

Whereas Home Switch (120) may be, for example, in New York, Guest Switch (130), for example, can be in London. In order to establish a connection between Main Station (110) and Switch (130), a sequence of signaling messages are exchanged between CPE Gateway (112), and Gateway (132) connected to Switch (130). For incoming calls to Main Station (110), these signaling messages can be used to detect whether or not the called Main Station is busy. For outgoing calls from Main Station (110), in accordance with Applicants' invention, signals are exchanged between Station (110) and CPE/Gateway (112) to indicate that a call is to be established using the Guest Switch (130). CPE/Gateway (112) will then exchange signaling messages with Gateway (132), and will use the destination address of Gateway (132) for transporting packets to that Gateway.

In accordance with Applicants' preferred embodiment, Main Station (110) has a telephone number, (Directory Number), on the Home Switch (120), and a separate telephone number on Guest Switch (130). Since Guest Switch (130) may have a completely different set of offered features, the translation information for Main Station (110) in Guest Switch (130) is separate from the translation information for Main Station (110) in Home Switch (120). Both Switches (120) and (130) include a translation to translate between the telephone number of Main Station (110) and the Packet Address of the CPE/Gateway (112) . . . connected to that Main Station. On incoming calls, this translation is used to establish the final link of the call; namely, the link between Home Switch (120) or Guest Switch (130), and Main Station (110) via Gateway (122) or (132), Packet Network (100), and CPE/Gateway (112).

In accordance with one feature of Applicants' preferred embodiment, Main Station (110) and its associated CPE/Gateway (112), can move. In moving, the Packet Address of the port connected to the Packet Network (100) is changed. In order to accomplish this move, Main Station (110)

registers with a Location Server (150) connected to the Packet Network, plugging into a new port on the Packet Network. On an incoming call, arriving via Home Switch (120) or Guest Switch (130) prior to sending the initial set-up message to CPE/Gateway (112), Gateway (122) or (132) queries Location Server (150) through Packet Network (100) in order to determine the identity of the port to which Main Station (110) is connected. In an alternate embodiment, Location Server (150) can signal to Gateway (122) and Gateway (132), the identity of the new port to which Main Station (110) is connected, and these Gateways do not then need to query the Location Server on all incoming calls. On outgoing calls, in accordance with Applicants' preferred embodiment, the identity of Main Station (110) is passed along with one of the initial set-up messages between that Gateway and the Gateway of the Home or Guest Switch, and that Gateway will then store an identification of the port with which it should communicate for this call.

In FIG. 1, only one Home Switch and one Guest Switch are shown. Clearly, the same arrangement can be used for multiple Guest Switches. Further, in order to enhance the reliability of service, it may be desirable to use one Guest Switch relatively close to the customer of Main Station (110). The decision on whether to route an outgoing call via the Home Switch (120), or such a Guest Switch, can be implemented in the same way that a customer using Main Station (110) can specify that any other Guest Switch is to be used on a particular call, thus implementing a dynamic routing feature at the CPE/Gateway.

Further, a Service Administrator Terminal (160) can be connected to the Packet Network (100). Messages from that Terminal can be used to direct calls away from a particular Home Switch to an appropriate Guest Switch, specified in the message or pre-stored in the CPE/Gateway (112). Such a message can be sent if Home Switch (120) is overloaded or defective. For incoming calls, the PSTN routes the call to the Home Switch serving the called party's directory number as determined by conventional routing, or by a local number portability database. If the incoming calls are delivered over the packet network, they terminate at the Home or Guest Switch as determined by the location server.

In case both the calling and the called telephones are enhanced Main Stations, the call set-up procedure begins with the same processes as used in case the Destination Main Station is not connected to the Packet Network. However, once the connection has been established, voice packets can be transmitted directly from the CPE/Gateway of the calling Main Station to the CPE/Gateway of the called station, while signaling packets continue to be transmitted to the called party serving switch using existing SS7/BICC interworking as in the prior art.

For calls between stations, neither of which is connected to the Packet Network, the source switch, or some intermediate tandem or toll switch directly or indirectly serving the source switch, can have a route to the destination switch or to a toll or a tandem switch serving the destination switch, which transports voice signals over the Packet Network. Such connections are established by the Gateways of the two switches connected to the Packet Network. Routing is accomplished in accordance with known data network routing for voice over IP.

For customers receiving telephone and data service over a cable, the cable distribution network can be used instead of, or in addition to, the Packet Network (100) to access the Gateway of a Home or Guest Switch. A cable service operator can use the high frequency cable distribution network to connect customer CPE/Gateway to the cable, using radio frequency transmission over the cable, as is known in the prior art. The high frequency cable interfaces with the Wide Area Network, using a Cable Modem Termination System (CMTS), and interfaces with the PSTN using an Internet Protocol (IP) to Time Division Modulation (TDM) Gateway.

The routing ability of the CPE/Gateway uses the cable transport network to communicate with the Home or Guest Switches served by the Wide Area Network.

FIG. 2 is a flow diagram illustrating the operation of an incoming call. The incoming call is routed to the destination switch serving the enhanced Main Station, Action Block (202). This routing is performed through the Public Switched Telephone Network (PSTN), or if the call is from a line connected to the switch serving that Main Station via a line, or if the call is from another enhanced Main Station via the Packet Network. The Gateway of the destination switch obtains either the home port address of the destination CPE/Gateway from Translation Tables in the Home Switch. The Gateway of the destination switch checks with the location server to obtain the current port address of the CPE/Gateway, and substitutes this port address for the home port address if it is different, Action Block (206). A dialogue using the principles of the set-up protocol is then established between the Gateway of the destination switch and the CPE/Gateway. This dialogue is used, for example, to establish whether the incoming call is to a busy telephone. If the result of the dialogue is positive, i.e., that a connection can be established to the enhanced Main Station, then the call is routed from the destination switch to the destination Main Station via the Gateway of the destination switch, the Packet Network, and the CPE/Gateway of the called station.

FIG. 3 illustrates the process of establishing an outgoing call. The Main Station signals to the CPE/Gateway, the identity of the Home Switch port or the Guest Switch from which it is to be served on this call, Action Block (302). The signal may be a default signal in case the Home Switch is being used. The CPE/Gateway stores the identity of the Guest Switches so that it can respond to an indication of which of several Guest Switches is to be used by generating the identity of the Guest Switch. The identity of the Guest Switch is stored in the CPE/Gateway as the identity of a port for accessing the Gateway of the Guest Switch. The CPE/Gateway and the Gateway of the Home Switch or the Guest Switch to be used for this call then have a dialogue to establish the connection, Action Block (304). If the port identity of the Switch Gateway being used is unique to that Main Station, then it is not necessary to transmit the telephone number of the Main Station in this dialogue; otherwise, it is necessary to transmit this information in order to have appropriate information, for example, for billing calls. The Gateway of the Home or Guest Switch, signals that switch with a request to be connected to the destination telephone number of this outgoing call, Action Block (306). The Home or Guest Switch then controls the establishment of a connection to this destination telephone number using the principles of the prior art, Action Block (308).

FIG. 4 is a flow diagram illustrating the process of registering an enhanced Main Station having the service feature that it can be served from a port other than the home port of the Packet Network. The enhanced Main Station prepares to unplug from the home port, Action Block (402). The CPE/Gateway sends an unplug message via the Packet Network to the location server, Action Block (404). The location server records that the Main Station is not connected, Action Block (406). In addition, it may be desirable at this point to inform the Home Switch that the Main Station is not connected, so that incoming calls to that Main Station will simply be blocked, or connected to an appropriate announcement. At some later time, the enhanced Main Station is plugged into a new port, Action Block (408). The CPE/Gateway of the enhanced Main Station sends a registration message to the location server, Action Block (410). This registration message includes the identity of the enhanced Main Station and the identity of the port from which it is transmitted. The location server sends a new port identification to the Home Switch, Action Block (412). Subsequently, the enhanced Main Station is served from the new port, but continues to be served from the Home Switch, Action Block (414).

The above description is of one preferred embodiment of Applicants' invention. Other embodiments will be apparent to those of ordinary skill in the art without departing from the scope of the invention. The invention is limited only by the attached claims

What is claimed is:

1. A method of establishing a connection between CPE (Customer Premises Equipment) and a serving switch comprising the steps of:
   connecting said CPE to a Packet Network;
   connecting a path between said CPE and said Packet Network to a Home Switch or a Guest Switch connected to said Packet Network, said Home Switch or said Guest Switch for providing originating service to said CPE;
   selecting said one of said Home Switch or guest Switch on the basis of a packet header address based on information from said CPE;
   wherein outgoing calls from said CPE are originated from the selected switch and terminated on a terminating switch for serving a called number;
   further comprising the steps of:
   disconnecting said CPE from said Packet Network;
   reconnecting said CPE to said Packet Network at a different port connected to a different switch; and
   recording in a Location Server which is connected to said Packet Network an identity of said different port and different switch for completing calls to and from said CPE at said different port wherein a Service Administration Terminal is transmitting signals via said Packet Network to said CPE for changing an identity of a switch for serving outgoing calls.

2. A method of establishing a connection between CPE (Customer Premises Equipment) and a serving switch comprising the steps of:
   connecting said CPE to a Packet Network;
   connecting a path between said CPE and said Packet Network to a Home Switch or a Guest Switch connected to said Packet Network, said Home Switch or said Guest Switch for providing originating service to said CPE;
   selecting said one of said Home Switch or guest Switch on the basis of a packet header address based on information from said CPE;
   wherein outgoing calls from said CPE are originated from the selected switch and terminated on a terminating switch for serving a called number;
   wherein said Packet Network is connected to a Service Administration Terminal, further comprising the step of transmitting signals via said Packet Network from said Service Administration Terminal to said CPE for changing an identity of a switch for serving outgoing calls.

3. In a telecommunication network comprising a Packet Network, a Home Switch and at least one Guest Switch, apparatus for establishing a connection between CPE (Customer Premises Equipment) and a serving switch comprising the steps of:
   means for connecting said CPE to a Packet Network;
   means for connecting a path between said CPE and said Packet Network to a Home Switch or a Guest Switch connected to said Packet Network, said Home Switch or said Guest Switch for providing originating service to said CPE; and
   means for selecting as a serving switch, one of said Home Switch or said Guest Switches on the basis of a packet header address based on information from said CPE;
   wherein outgoing calls from said CPE are originated from the selected switch and terminated on a terminating switch for serving a called number;
   further comprising:
   means for detecting a disconnection of said CPE from said Packet Network;
   means for detecting a re-connection of said CPE to said Packet Network at a different port connected to a different switch; and
   means, in a Location Server which is connected to said Packet Network for recording an identity of said different port and different switch for completing calls to and from said CPE at said different port wherein a Service Administration Terminal is transmitting signals via said Packet Network to said CPE for changing an identity of a switch for serving outgoing calls.

4. In a telecommunication network comprising a Packet Network, a Home Switch and at least one Guest Switch, apparatus for establishing a connection between CPE (Customer Premises Equipment) and a serving switch comprising the steps of:
   means for connecting said CPE to a Packet Network;
   means for connecting a path between said CPE and said Packet Network to a Home Switch or a Guest Switch connected to said Packet Network, said Home Switch or said Guest Switch for providing originating service to said CPE; and
   means for selecting as a serving switch, one of said Home Switch or said Guest Switches on the basis of a packet header address based on information from said CPE;
   wherein outgoing calls from said CPE are originated from the selected switch and terminated on a terminating switch for serving a called number;
   wherein said Packet Network is connected to a Service Administration Terminal, further comprising means for transmitting signals via said Packet Network from said Service Administration Terminal to said CPE for changing an identity of a switch for serving outgoing calls.

* * * * *